United States Patent
Chand et al.

(12)

(10) Patent No.: US 10,999,253 B2
(45) Date of Patent: May 4, 2021

(54) MAINTAINING INTERNET PROTOCOL SECURITY TUNNELS

(71) Applicant: Juniper Networks, Inc., Sunnyvale, CA (US)

(72) Inventors: Naresh Chand, Bhoganahalli Village (IN); Ranjan Sinha, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 207 days.

(21) Appl. No.: 16/046,381

(22) Filed: Jul. 26, 2018

(65) Prior Publication Data
US 2020/0036679 A1    Jan. 30, 2020

(51) Int. Cl.
*H04L 29/06* (2006.01)
*H04L 12/841* (2013.01)
*H04L 29/08* (2006.01)
*H04L 12/46* (2006.01)

(52) U.S. Cl.
CPC ............ *H04L 63/029* (2013.01); *H04L 47/28* (2013.01); *H04L 63/0485* (2013.01); *H04L 67/1074* (2013.01); *H04L 12/4633* (2013.01)

(58) Field of Classification Search
CPC ... H04L 63/029; H04L 47/28; H04L 63/0485; H04L 67/1074; H04L 12/4633; H04L 63/20; H04L 63/0272; H04L 63/164; H04L 63/061; H04L 63/18; H04L 47/26
See application file for complete search history.

(56) References Cited

U.S. PATENT DOCUMENTS 8,050,218 B2    11/2011 Morishige et al.
2005/0268331 A1*  12/2005 Le .................. H04L 63/0263
                                                      726/11

(Continued)

FOREIGN PATENT DOCUMENTS

EP            2907272 A1    8/2015

OTHER PUBLICATIONS

Graham Bartlett et al. "IKEv2 IPsec Virtual Private Networks," pp. 189-608, 2017 (Year: 2017).*

(Continued)

*Primary Examiner* — Luu T Pham
*Assistant Examiner* — Canh Le
(74) *Attorney, Agent, or Firm* — Harrity & Harrity, LLP

(57) ABSTRACT

A network device identifies an Internet Protocol Security (IPsec) tunnel that connects the network device to a remote device and determines that dead peer detection (DPD) is enabled at the network device. The network device receives a first DPD request message from the remote device via the IPsec tunnel, and sends a first DPD response message to the remote device via the IPsec tunnel. The network device determines that a workload of the network device satisfies a threshold amount, and sends one or more encapsulating security payload (ESP) packets that include traffic flow confidentiality (TFC) payload data to the remote device via the IPsec tunnel. The network device determines that the workload of the network device does not satisfy the threshold amount. The network device receives a second DPD request message from the remote device and sends a second DPD response message to the remote device via the IPsec tunnel.

20 Claims, 11 Drawing Sheets

(56) References Cited

U.S. PATENT DOCUMENTS

| | | | | |
|---|---|---|---|---|
| 2008/0313328 | A1* | 12/2008 | Dahlin | H04L 29/06 709/224 |
| 2011/0066858 | A1* | 3/2011 | Cheng | H04L 63/164 713/171 |
| 2012/0078998 | A1 | 3/2012 | Son et al. | |
| 2012/0300615 | A1* | 11/2012 | Kempf | H04L 41/0695 370/216 |
| 2014/0241247 | A1* | 8/2014 | Kempf | H04L 12/4641 370/328 |
| 2014/0328196 | A1* | 11/2014 | Arad | H04L 47/215 370/252 |
| 2015/0288765 | A1* | 10/2015 | Skraparlis | H04L 67/142 709/228 |
| 2016/0021194 | A1* | 1/2016 | Prabhakar | H04L 63/20 709/204 |
| 2016/0359622 | A1* | 12/2016 | Bunch | H04L 67/1097 |
| 2017/0149743 | A1* | 5/2017 | Fukuda | H04L 63/0428 |
| 2018/0205713 | A1* | 7/2018 | Yadav | H04L 63/0428 |
| 2018/0205722 | A1* | 7/2018 | Getschmann | H04W 76/12 |

OTHER PUBLICATIONS

S. Kent et al. "IP Encapsulating Security Payload (ESP)", pp. 1-22, 1998. (Year: 1998).*

G. Huang et al., "A Traffic-Based Method of Detecting Dead Internet Key Exchange (IKE) Peers", https://tools.ietf.org/html/rfc3706, Feb. 2004, 12 pages.

D. Harkins et al., "The Internet Key Exchange (IKE)", https://tools.ietf.org/html/rfc2409, Nov. 1998, 42 pages.

S. Kent, "IP Encapsulating Security Payload (ESP)", https://tools.ietf.org/html/rfc4303, Dec. 2005, 45 pages.

Benny B., "Emerging Technologies in Wireless LANs: Theory, Design and Deployment, 17.3.10.1: NAT Keep Alive, 18.3.4: Traversing Network Address and Port Address and Port Translators", Nov. 5, 2007, Benny B., Ed, Cambridge University Press, New York, pp. 385-434, XP002758633.

Extended European Search Report for Application No. EP19165919.2, dated Oct. 23, 2019, 10 pages.

* cited by examiner

102 – Network device A identifies an IPsec tunnel that connects network device A to network device B

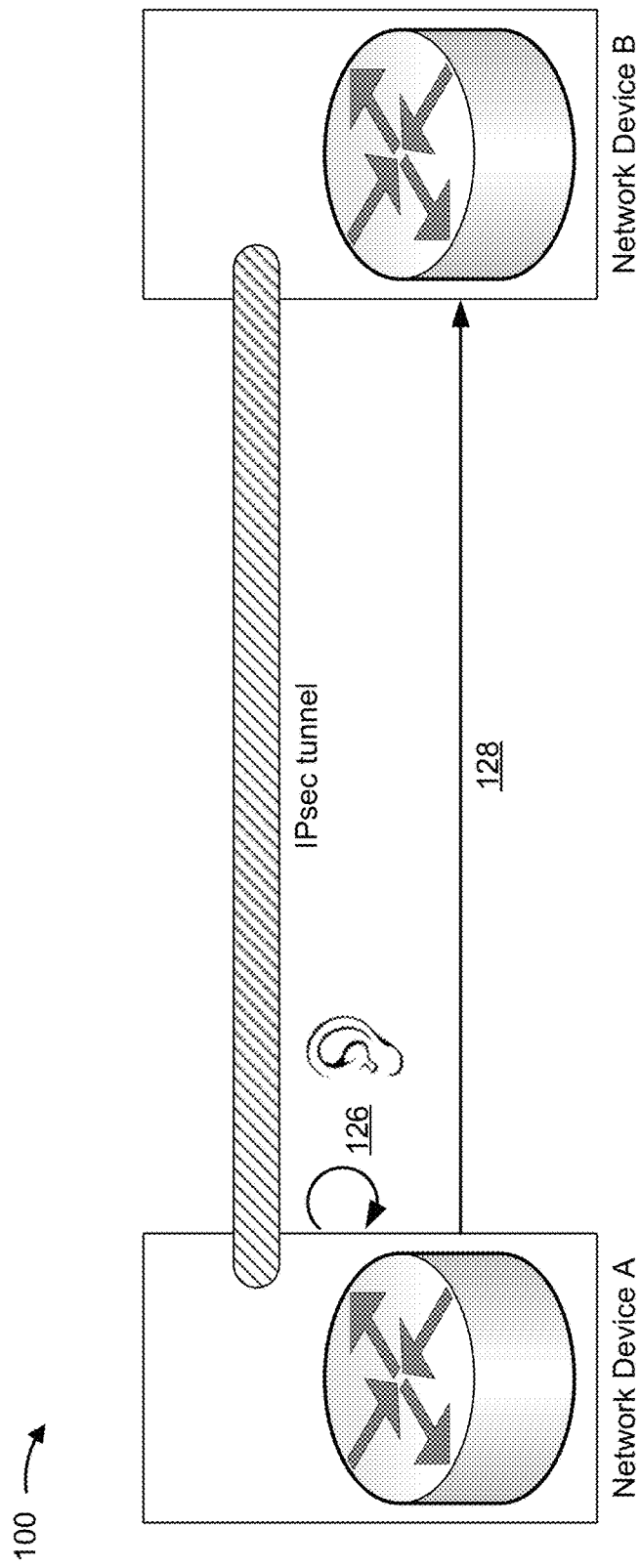

130 – Format of ESP packet

MAINTAINING INTERNET PROTOCOL SECURITY TUNNELS

BACKGROUND

Dead Peer Detection (DPD) may be used by an Internet Key Exchange (IKE) network device to detect a dead IKE peer. DPD also may be used to reclaim resources of the IKE network device in case a dead IKE peer is found.

SUMMARY

According to some implementations, a method may include identifying, by a device, an Internet Protocol Security (IPsec) tunnel that connects the device to a remote device, and determining, by the device, that dead peer detection (DPD) is enabled at the device. The method may include receiving, by the device, a first DPD request message from the remote device via the IPsec tunnel, and sending, by the device, a first DPD response message to the remote device via the IPsec tunnel. The method may include determining, by the device, that a workload of the device satisfies a threshold amount, and sending, by the device and based on determining that the workload of the device satisfies the threshold amount, one or more encapsulating security payload (ESP) packets that include traffic flow confidentiality (TFC) payload data to the remote device via the IPsec tunnel. The method may include determining, by the device and after sending the one or more ESP packets, that the workload of the device does not satisfy the threshold amount. The method may include receiving, by the device, a second DPD request message from the remote device via the IPsec tunnel, and sending, by the device, a second DPD response message to the remote device via the IPsec tunnel.

According to some implementations, a device may include one or more memories, and one or more processors to identify an Internet Protocol Security (IPsec) tunnel that connects the device to a remote device, and to determine that a dead peer detection (DPD) process is enabled at the device. The one or more processors may identify a recurring interval associated with the DPD process, and maintain the IPsec tunnel, wherein, when maintaining the IPsec tunnel, the one or more processors are to listen for traffic on the IPsec tunnel during the recurring interval, determine that there was no traffic on the IPsec tunnel during the recurring interval, and send, based on determining that there is no traffic on the IPsec tunnel during the recurring interval, one or more encapsulating security payload (ESP) packets that include traffic flow confidentiality (TFC) payload data to the remote device via the IPsec tunnel.

According to some implementations, a non-transitory computer-readable medium may store instructions that include one or more instructions that, when executed by one or more processors of a device, cause the one or more processors to recognize an Internet Protocol Security (IPsec) tunnel that connects the device to a remote device, and to determine that the device uses dead peer detection (DPD). The one or more instructions may cause the one or more processors to determine a trigger interval associated with DPD at the device, to determine that a workload of the device satisfies a first threshold amount, and to increase, based on determining that the workload of the device satisfies the first threshold amount, the trigger interval. The one or more instructions may cause the one or more processors to send, after increasing the trigger interval, a first DPD request message to the remote device via the IPsec tunnel based on the trigger interval, and to receive a first DPD response message from the remote device via the IPsec tunnel based on sending the first DPD request message. The one or more instructions may cause the one or more processors to determine that the workload of the device satisfies a second threshold amount, and to decrease, based on determining that the workload of the device satisfies the second threshold amount, the trigger interval. The one or more instructions may cause the one or more processors to send, after decreasing the trigger interval, a second DPD request message to the remote device via the IPsec tunnel based on the trigger interval, and to receive a second DPD response message from the remote device via the IPsec tunnel based on sending the second DPD request message.

BRIEF DESCRIPTION OF THE DRAWINGS

FIGS. 1A-1F are diagrams of example implementations described herein.

DETAILED DESCRIPTION

Figure 1A:
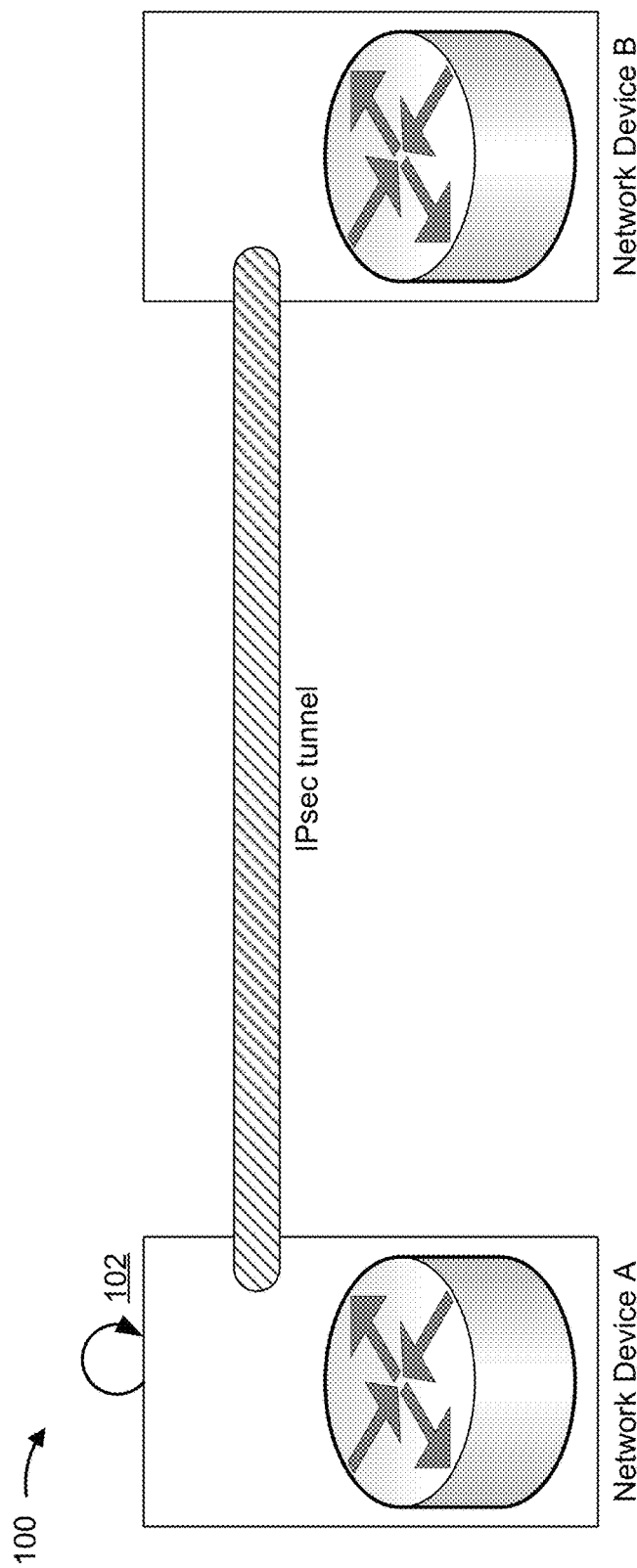

The following detailed description of example implementations refers to the accompanying drawings. The same reference numbers in different drawings may identify the same or similar elements.

Dead Peer Detection (DPD) may be used by an Internet Key Exchange (IKE) network device to detect situations where connectivity between the IKE network device and an IKE peer goes down, such as when the IKE peer goes offline (e.g., the IKE peer is dead). The IKE network device may use DPD to generate and send an encrypted IKE message (e.g., a DPD request message) to the IKE peer and determine the state of the IKE peer (e.g., the IKE peer is up or down, alive or dead, and/or the like) based on whether the IKE network device receives an encrypted IKE message (e.g., a DPD response message) from the IKE peer acknowledging the IKE network device's message. If the IKE network device determines that the IKE peer is dead, the IKE network device may reclaim resources of the IKE network device that were dedicated to connecting the IKE network device to the dead IKE peer. In this way, DPD may ensure that resources of the IKE network device are dedicated to connections with only live IKE peers.

However, in some cases, the IKE network device and/or the IKE peer may be overloaded, which may cause a delay in sending and/or receiving DPD messages. This may result in the IKE network device erroneously determining that the IKE peer is dead and then reclaiming resources that should be maintained, such as breaking down an Internet Protocol Security (IPsec) tunnel that connects the IKE network device to the IKE peer. In turn, this may overload the IKE network device and IKE peer even more, because resources will have to be dedicated to connecting the IKE network device to the IKE peer again, such as constructing a new IPsec tunnel. This may create a cycle of reclaiming and dedicating resources that may choke the processing functions of the IKE network device and the IKE peer. Similarly, this may cause IPsec tunnel flapping (e.g., an IPsec tunnel continuously being created and destroyed) or may result in delayed establishment of IPsec tunnels.

Some implementations described herein provide a network device that is capable of modifying DPD at the network device to maintain an IPsec tunnel with a peer network device while reducing a workload of processing resources associated with the network device. In some implementations, the network device may determine that the workload of the network device satisfies a threshold amount, generate one or more encapsulating security payload (ESP) packets (e.g., one or more ESP packets with traffic flow confidentiality (TFC) payload data), and send the one or more ESP packets to the network device via the IPsec tunnel. In this way, the network device and the peer network device may not need to exchange DPD messages because the network device creates traffic on the IPsec tunnel. In some implementations, the network device may determine that the workload of the network device satisfies a threshold amount and modify an interval associated with DPD at the network device to exchange DPD messages with the network device according to the interval. In this way, the network device may not need to send and/or receive as many DPD messages while the workload of the network device is high, which may aid in reducing the workload of the network device. In some implementations, the network device may disable DPD at the network device, generate one or more ESP packets (e.g., one or more ESP packets with TFC payload data), and send the one or more ESP packets to the network device via the IPsec tunnel to maintain traffic on the IPsec tunnel and prevent the peer network device from sending DPD request messages to the network device. In this way, the network device may not need to dedicate processing resources to DPD while the network device maintains the IPsec tunnel by generating and sending the one or more ESP packets.

In this way, implementations described herein enable the network device and the network device to stay connected via the IPsec tunnel even when the network device or the network device is overloaded. In this way, time is not wasted reinitiating IKE and IPsec negotiations between the network device and the network device. Moreover, in this way, the workload of the network device may be reduced because fewer processor and/or memory resources of the network device would be used relative to traditional DPD.

In this way, a process for maintaining IPsec tunnels is automated and the network device may maintain numerous (e.g., hundreds, thousands, millions, and/or the like) IPsec tunnels at the same time. This may improve speed and efficiency of the process and conserve computing resources (e.g., processor resources, memory resources, and/or the like) of the network device. Furthermore, automating the process for maintaining IPsec tunnels conserves computing resources (e.g., processor resources, memory resources, and/or the like) that would otherwise be wasted using a traditional DPD process.

FIGS. 1A-1F are diagrams of example implementations 100 described herein. As shown in FIG. 1A, implementation 100 may include a first network device (shown as network device A) and a second network device (shown as network device B).

The first network device and/or the second network device may include various types of network devices, such as a router, a gateway, a switch, a bridge, a wireless access point, a base station, a firewall, and/or the like. The first network device and the second network device may be included in a network, such as a cellular network, a local area network (LAN), a core network, an access network, a wide area network (WAN) such as the Internet, a cloud network, and/or the like. In some implementations, a neighbor device (not shown) may be communicatively connected with the first network device and/or the second network device through another neighbor device. In some implementations, a neighbor device may be communicatively connected directly with the first network device and/or the second network device (i.e., where there is no other neighbor device in the communications path between the neighbor device and the first network device and/or the second network device).

The first network device and/or the second network device may include various communication planes, such as a data plane, a control plane, and/or the like. The data plane of a network device may generate, receive, process, and/or transmit data plane packets. A data plane packet may be a packet that is originated in the control plane of the network device (i.e., generated by the network device) or terminated in the control plane of the network device (i.e., the network device is the destination of the packet). A data plane packet may be a packet that travels through the network device. The data plane may receive a data plane packet, perform a lookup in a forwarding information base (FIB) on the network device to identify forwarding information associated with the data plane packet (e.g., information identifying a destination of the data packet, information identifying a next hop in a route to the destination, and/or the like), and transmit the data plane packet to the next hop based on the forwarding information. The network device may have processing and/or memory resources that are dedicated to performing the functions of the data plane.

The control plane of the network device may generate, receive, process, and/or transmit control plane packets. A control plane packet may be a packet that originated in the control plane of the network device (i.e., generated by the network device) or terminated in the control plane of the network device (i.e., the network device is the destination of the packet). In some implementations, a control plane packet may be generated at a neighbor device, and the network device may forward the control plane packet to another neighbor device. The control plane may include a control plane, a FIB, a FIB cache associated with the FIB, and/or other elements.

The control plane may perform various functions, such as populating the FIB with forwarding information, maintaining the forwarding information stored in the FIB (e.g., updating the forwarding information stored in the FIB, removing forwarding information from the FIB, and/or the like), establishing and/or terminating a control plane session between the control plane and another component in the network device and/or between the control plane and a device external to the network device, managing the data plane, populating and maintaining the FIB cache for a control plane session, encrypting and decrypting traffic to and from the control plane, establishing and/or tearing down a tunnel with a device external to the network device (e.g., an Internet Protocol Security (IPsec) tunnel), and/or the like. The network device may have processing and/or memory resources that are dedicated to performing the functions of the control plane.

In some implementations, the first network device and the second network device may be Internet Key Exchange (IKE) network devices. In some implementations, the control plane of the first network device and the second network device, respectively, runs an IKE server that handles IKE exchanges (e.g., information communicated on an IPsec tunnel). In some implementations, the first network device and the second network device are peer IKE network devices. In some implementations, the first network device may be connected to the second network device. In some implementations, the first network device may be connected to the second network via an IPsec tunnel.

As shown by reference number 102, the first network device may identify and/or recognize an IPsec tunnel that connects the first network device to the second network device. In some implementations, the first network device may communicate with the second network device via the IPsec tunnel. For example, the first network device may send packets, such as User Datagram Protocol (UDP) packets, to the second network via the IPsec tunnel.

Figure 1B:
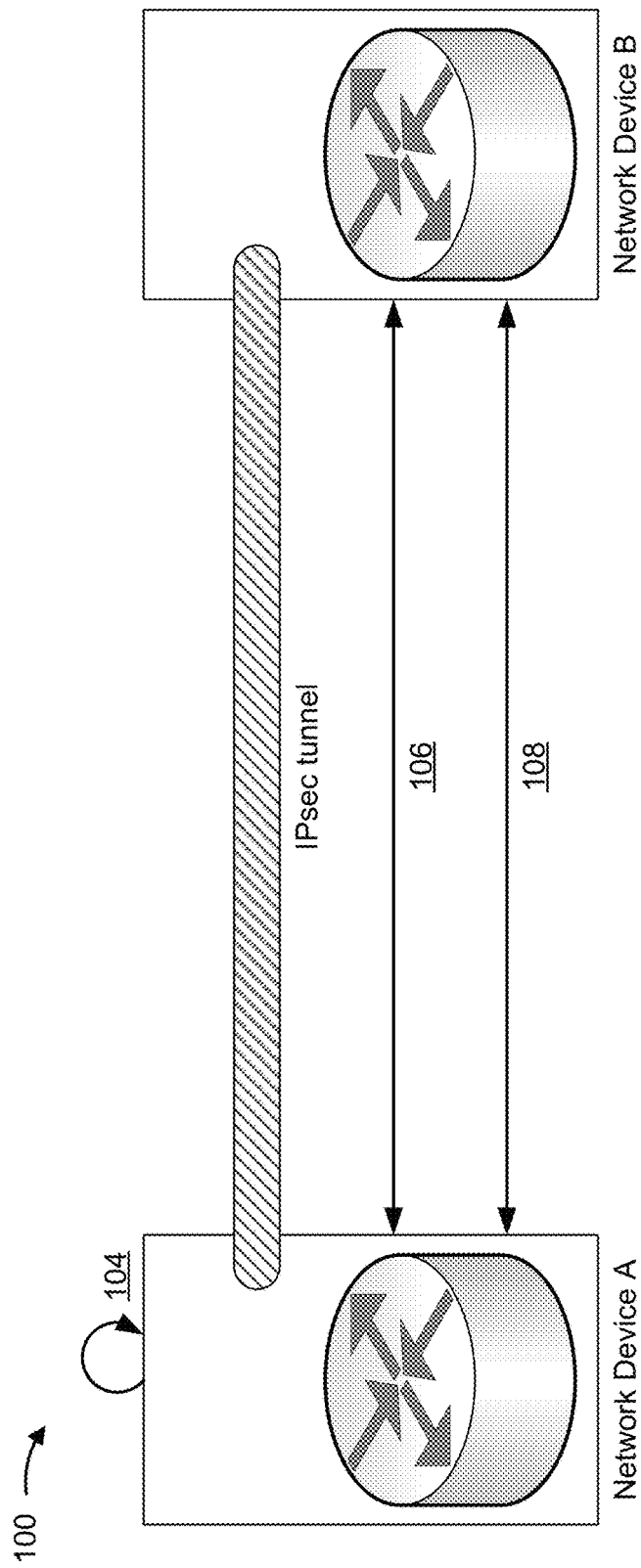

As shown in FIG. 1B and by reference number 104, the first network device may determine that Dead Peer Detection (DPD) and/or a DPD process is enabled at the first network device. In some implementations, the first network device may use DPD when the IPsec tunnel is idle (e.g., the first network device is not receiving packets, information, messages, and/or the like from the second network device and/or the first network device is not transmitting packets, information, messages, and/or the like to the second network device). The IPsec tunnel may be idle because the IPsec tunnel may be experiencing routing issues, the first network device and/or second network device may be busy, the first network device and/or the second network device may be offline, and/or the like.

In some implementations, DPD allows the first network device and the second network device to exchange DPD messages to prove liveliness of the second network device to the first network device, and vice versa. For example, as shown by reference number 106, the first network device, via the IPsec tunnel, may generate and send a DPD request message to the second network device and receive a DPD response message from the second network device. Based on this exchange, the first network device may determine that second network device is alive and that the IPsec tunnel should be maintained. As a further example, as shown by reference number 108, the first network device, via the IPsec tunnel, may receive a DPD request message from the second network device and generate and send a DPD response message to the second network device. Based on this exchange, the first network device may prove that the first network device is alive to the second network device. Similarly, because the first network device received the DPD request message from the second network device, the first network device may determine that the second network device is alive and that the IPsec tunnel should be maintained.

In some implementations, the first network device and the second network device communicate the DPD messages via the control plane of the first network device and the control plane of the second network device, respectively. For example, the first network device generates and sends a DPD request message to the second network device via the control plane of the first network device and receives a DPD response message from the second network device via the control plane of the first network device. As an additional example, the first network device receives a DPD request message from the second network device via the control plane of the first network device and generates and sends a DPD response message to the second network device via the control plane of the first network device.

In some implementations, an interval (e.g., a recurring interval, a trigger interval, a periodic interval, and/or the like) may be associated with DPD and/or the DPD process at the first network device. The interval may specify an amount of time (e.g., 1 second, 5 seconds, 50 seconds, 5 minutes, and/or the like) that the first network device waits to generate and send a DPD request message after detecting idleness of the IPsec tunnel and/or an amount of time (e.g., 1 second, 5 seconds, 50 seconds, 5 minutes, and/or the like) that the first network device waits to respond to a DPD request message.

Figure 1C:
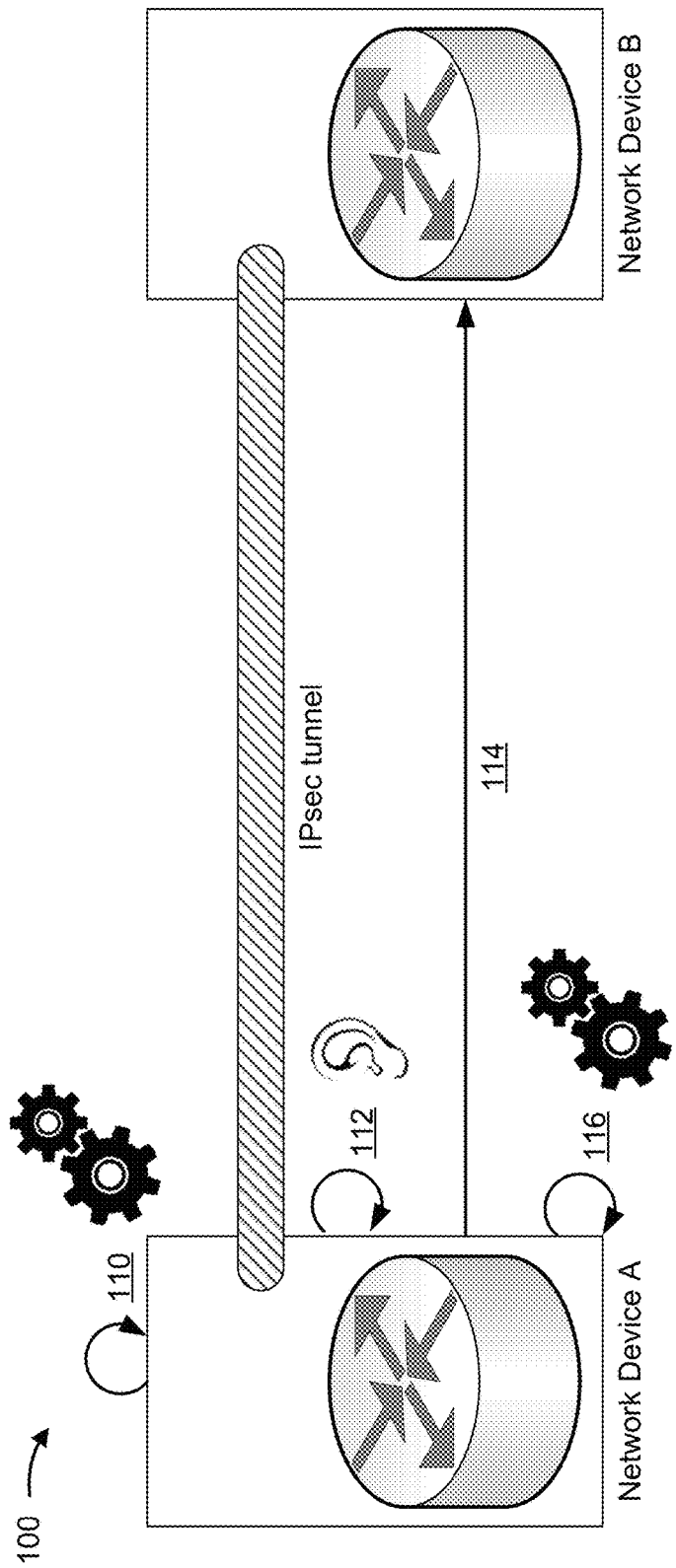

In some implementations, the first network device may use different options to maintain the IPsec tunnel and minimize the use of the first network device's control plane resources. In a first option, as shown in FIG. 1C, where the first network device is stressed (e.g., the control plane of the first network device has a high utilization rate, a high workload, and/or the like), the first network device may generate one or more encapsulating security payload (ESP) packets (e.g., one or more ESP packets with traffic flow confidentiality (TFC) payload data) and send the one or more ESP packets from the data plane of the first network device to the second network device via the IPsec tunnel. In this way, the first network device does not have to devote control plane processing resources to exchange DPD messages while the first network device is stressed, which may reduce the stress on the first network device.

In some implementations, the first network device may exchange DPD messages via the IPsec tunnel until a workload of the first network device satisfies a threshold amount. As shown by reference number 110, the first network device may determine that the workload of the first network device satisfies the threshold amount. For example, the first network device may determine that the processing resources of the first network device are being utilized at a level (e.g., a rate of utilization, such as 70%) that satisfies a threshold amount (e.g., a rate of utilization that must be exceeded, such as 50%). In some implementations, the workload of the first network device indicates a utilization of processing resources associated with the control plane of the first network device. For example, the first network device may determine that the workload of the first network device satisfies the threshold amount by determining that the utilization of processing resources associated with the control plane of the first network device satisfies the threshold amount. In some implementations, the first network device may disable DPD at the first network device (e.g., the first network device stops exchanging DPD messages) after the first network device determines that the workload of the first network device satisfies the threshold amount. In some implementations, the first network device may disable DPD at the first network device until the first network device determines that the workload of the first network device no longer satisfies the threshold amount.

As shown by reference number 112, the first network device may listen for traffic on the IPsec tunnel. In some implementations, the first network device may monitor the IPsec tunnel to determine whether a packet is sent or received via the IPsec tunnel. In some implementations, the first network device may monitor the IPsec tunnel to determine whether a packet is sent or received via the IPsec tunnel during the interval. In some implementations, the first network device may determine whether the first network device sent or received information via the IPsec tunnel during the interval. In some implementations, the first network device may determine whether the first network device sends one or more outgoing messages to the second network device via the IPsec tunnel during the interval and/or the first network device receives one or more incoming messages from the second network device via the IPsec tunnel during the interval.

In some implementations, based on listening for traffic on the IPsec tunnel, the first network device may determine that the IPsec tunnel is idle. In some implementations, the first network device may determine there is no traffic on the IPsec tunnel. In some implementations, the first network device may determine that there has been no traffic on the IPsec tunnel for the interval.

As shown by reference number 114, as an alternative to generating and sending a DPD request message from the control plane of the first network device to the second network device via the IPsec tunnel, the first network device may generate one or ESP packets (e.g., one or more ESP packets with TFC payload data) and send the one or more ESP packets from the data plane of the first network device to the second network device via the IPsec tunnel. In this way, the first network device maintains traffic on the IPsec tunnel by using control plane processing resources instead of control plane processing resources. For example, the first network device may generate and send, based on determining that the workload of the first network device satisfies the threshold amount, the one or more ESP packets to the second network device via the IPsec tunnel. In some implementations, the first network device, via the data plane of the first network device, may generate and send the one or more ESP packets to the second network device. In this way, because the first network device IPsec tunnel is no longer idle, the IPsec tunnel is maintained while the first network device generates and sends the one or more ESP packets to the second network device via the IPsec tunnel.

In some implementations, the first network device may determine a rate for generating and sending the one or more ESP packets. In some implementations, the rate may ensure that at least one ESP packet of the one or more ESP packets is generated and sent during the interval. In some implementations, the first network device may generate and send the one or more ESP packets to the second network device via the IPsec tunnel at the rate. In this way, the first network device generates and sends the one or more ESP packets to the second network device via the IPsec tunnel on a schedule that ensures that the second network device may determine that the first network device is alive and therefore maintain the IPsec tunnel.

As shown by reference number 116, the first network device may determine that the workload of the first network device no longer satisfies the threshold amount. In some implementations, the first network device may determine, after generating and sending the one or more ESP packets, that the workload of the device does not satisfy the threshold amount (e.g., the utilization rate of the first network device's resources does not exceed the rate of utilization that must be exceeded). As a result, the first network device may stop generating and sending the one or more ESP packets. In some implementations, the first network device enables DPD at the first network device (e.g., the first network device starts exchanging DPD messages again) after the first network device determines that the workload of the first network device does not satisfy the threshold amount.

Figure 1D:
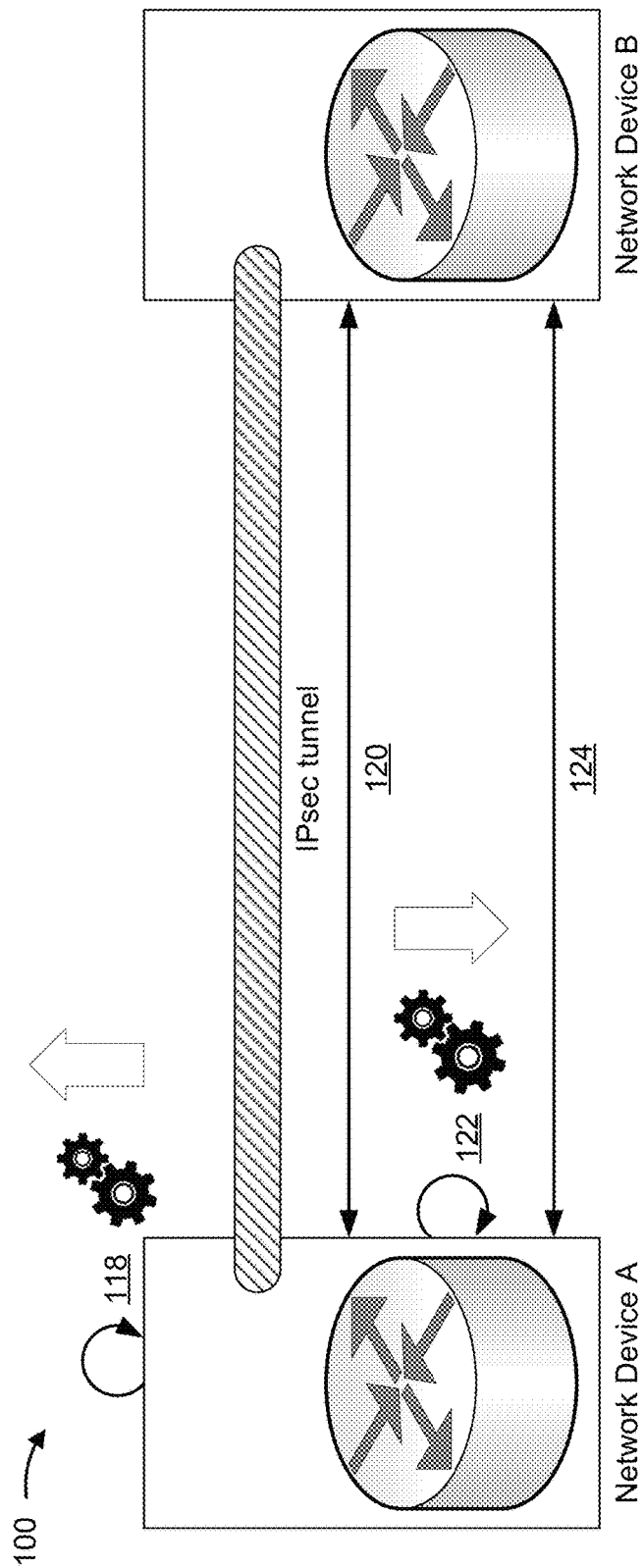

In a second option, as shown in FIG. 1D and by reference number 118, the first network device may determine that a workload of the first network device satisfies a first threshold amount in a similar manner to that described herein in relation to FIG. 1C. In some implementations, the first network device may increase, based on determining that the workload of the first network device satisfies the first threshold amount, the interval (e.g., the first network device may increase the amount of time associated with the interval, such as from 5 seconds to 10 seconds, from 20 seconds to 1 minute, from 2 minutes to 5 minutes, and/or the like). By increasing the interval, the network device may not need to send and/or receive as many DPD messages while the workload of the network device is high, which may aid in reducing the workload of the network device.

As shown by reference number 120, the first network device may send and/or receive DPD messages according to the interval (e.g., the first network device may exchange DPD messages based on the newly increased interval). For example, the first network device may generate and send, after increasing the interval, a first DPD request message to the second network device via the IPsec tunnel based on the interval. The first network device then may receive a first DPD response message from the second network device via the IPsec tunnel based on sending the first DPD request message.

In some implementations, the first network device may generate and send, after determining that the workload of the device satisfies the first threshold amount, one or more ESP packets (e.g., one or more ESP packets with TFC payload data) to the second network device via the IPsec tunnel. In some implementations, the second network device is able to identify and discard the one or more such ESP packets upon receipt after decryption. In some implementations, the first network device may generate and send one or more ESP packets to the second network device via the IPsec tunnel using a data plane of the first network device. In this way, the first network device may minimize the amount of DPD request messages that the first network device receives from the second network device, which minimizes the amount of processing resources the first network device has to dedicate to DPD, by ensuring that traffic is sent on the IPsec tunnel.

As shown by reference number 122, the first network device may determine that the workload of the device satisfies a second threshold amount (e.g., a utilization rate of the first network device's resources decreases to satisfy the second threshold amount, such as decreasing from 70% to 50%). In some implementations, the first network device may decrease, based on determining that the workload of the first network device satisfies the second threshold amount, the interval (e.g., the first network device may decrease the amount of time associated with the interval, such as from 10 seconds to 5 seconds, from 50 seconds to 20 seconds, from 6 minutes to 3 minutes, and/or the like). By decreasing the interval because the workload of the network device is low, the network device may be able to send and/or receive more DPD messages.

As shown by reference number 124, the first network device may send and/or receive DPD messages according to the interval (e.g., the first network device may exchange DPD messages based on the newly decreased interval). For example, the first network device may generate and send, after decreasing the interval, a second DPD request message to the second network device via the IPsec tunnel based on the interval. The first network device then may receive a second DPD response message from the second network device via the IPsec tunnel based on sending the second DPD request message.

In some implementations, the first network device may determine that the workload of the first network device satisfies a third threshold amount (e.g., a utilization rate of the first network device's resources increases to satisfy the third threshold amount, such as increasing from 70% to 90%). In some implementations, because the workload of the first network device is high, the first network device may disable DPD at the first network device (e.g., to use processing resources that were dedicated to DPD for other tasks) after the first network device determines that the workload of the first network device satisfies the third threshold amount in a similar manner as described herein in relation to FIG. 1C. In some implementations, after the first network device determines that the workload of the first network device satisfies the third threshold amount, the first network device may listen for traffic on the IPsec tunnel and generate and send one or more ESP packets (e.g., one or ESP packets with TFC payload data) to the second network device via the IPsec tunnel in a similar manner as described herein in relation to FIG. 1C.

In a third option, as shown in FIG. 1E, the first network device, regardless of the workload of the first network device, disables DPD at the first network device and maintains the IPsec tunnel by generating and sending one or more ESP messages (e.g., one or ESP packets with TFC payload data) to the second network device via the IPsec tunnel as long as the first network device does not detect traffic on the IPsec tunnel. As shown by reference number 126, the first network device listens for traffic on the IPsec tunnel in a similar manner as described herein in relation to FIG. 1C. For example, the first network device may listen for traffic on the IPsec tunnel during the interval. In some implementations, the first network device may determine that there was no traffic on the IPsec tunnel during the interval. For example, the first network device may determine that the first network device did not send or receive information via the IPsec tunnel during the interval.

As shown by reference number 128, the first network device may generate and send one or more ESP packets (e.g., one or ESP packets with TFC payload data) to the second network device via the IPsec tunnel while there is no traffic on the IPsec tunnel to maintain the IPsec tunnel. In some implementations, the first network device may generate and send, based on determining that there is no traffic on the IPsec tunnel during the interval, one or more ESP packets (e.g., one or ESP packets with TFC payload data) to the second network device via the IPsec tunnel. In some implementations, the first network device may generate and send the one or more ESP packets from a data plane of the first network device to the second network device via the IPsec tunnel.

Figure 1F:
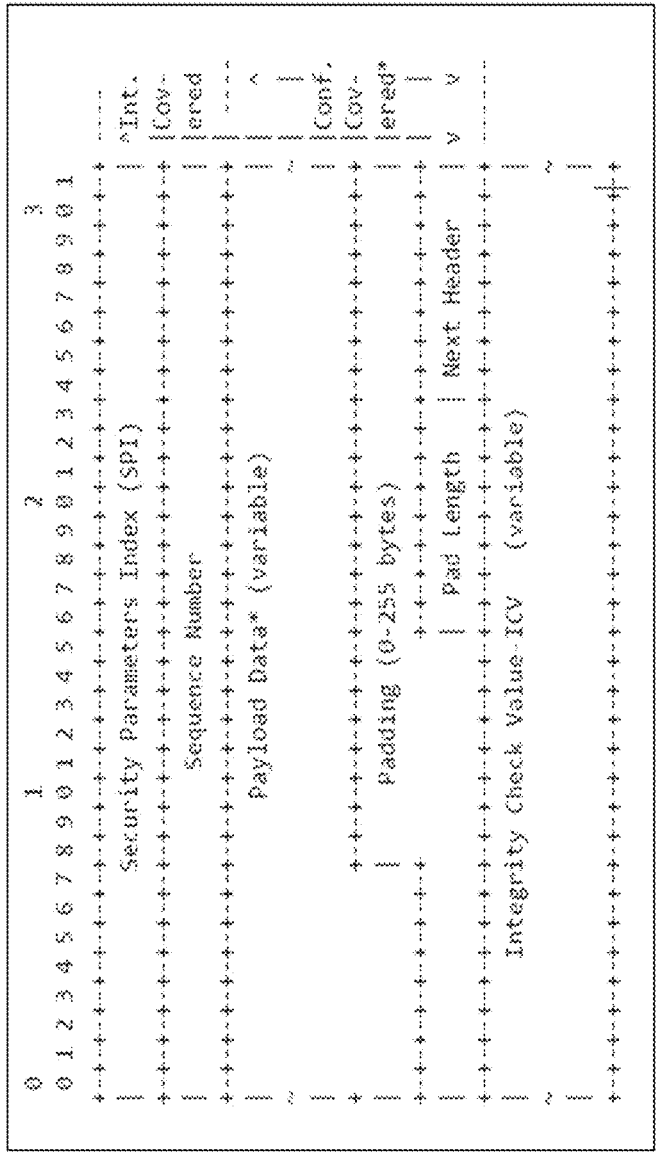

As shown in FIG. 1F and by reference number 130, the one or more ESP packets may include a protocol value that indicates that the one or more ESP packets are dummy packets. For example, a packet of the one or more ESP packets may include a protocol value of 59, e.g., a "Next Header" field with a value of 59, to designate the packet as a dummy packet. Upon receiving the one or more ESP packets, the second network may identify the one or more ESP packets as dummy packets, which causes the network device to use minimal processing resources to discard the one or more ESP packets. In some implementations, the packet may include a "Payload Data" field that includes TFC payload data. In some implementations, the packet may include additional fields (e.g., Security Parameter Index (SPI), Sequence Number, Padding, Pad Length, or Integrity Check Value (ICV)). In some implementations, the one or more ESP packets are formatted to cause the second network device to discard the one or more ESP packets upon receiving the one or more ESP packets. For example, the one or more ESP packets may include a protocol value of 59 and Payload Data that includes plaintext that is not well-formed (e.g., the Payload Data includes random bytes). In some implementations, the one or more ESP packets are one or more dummy packets that are discarded without prejudice by the second network device.

In this way, implementations described herein enable a network device and a peer network device to stay connected via an IPsec tunnel even when the network device and/or the peer network device is overloaded. In this way, time is not wasted reinitiating IKE and IPsec negotiations between the network device and the peer network device. Moreover, in this way, a workload of the network device may be reduced because fewer processor and/or memory resources of the network device are used to keep the IPsec tunnel active relative to a traditional DPD process. Furthermore, a process for maintaining IPsec tunnels is automated and the network device may maintain numerous (e.g., hundreds, thousands, millions, and/or the like) IPsec tunnels at the same time. This may improve speed and efficiency of the process and conserve computing resources (e.g., processor resources, memory resources, and/or the like) of the network device. Furthermore, automating the process for maintaining IPsec tunnels conserves computing resources (e.g., processor resources, memory resources, and/or the like) that would otherwise be wasted using a traditional DPD process.

As indicated above, FIGS. 1A-1F are provided merely as examples. Other examples are possible and may differ from what was described with regard to FIGS. 1A-1F.

Figure 2:
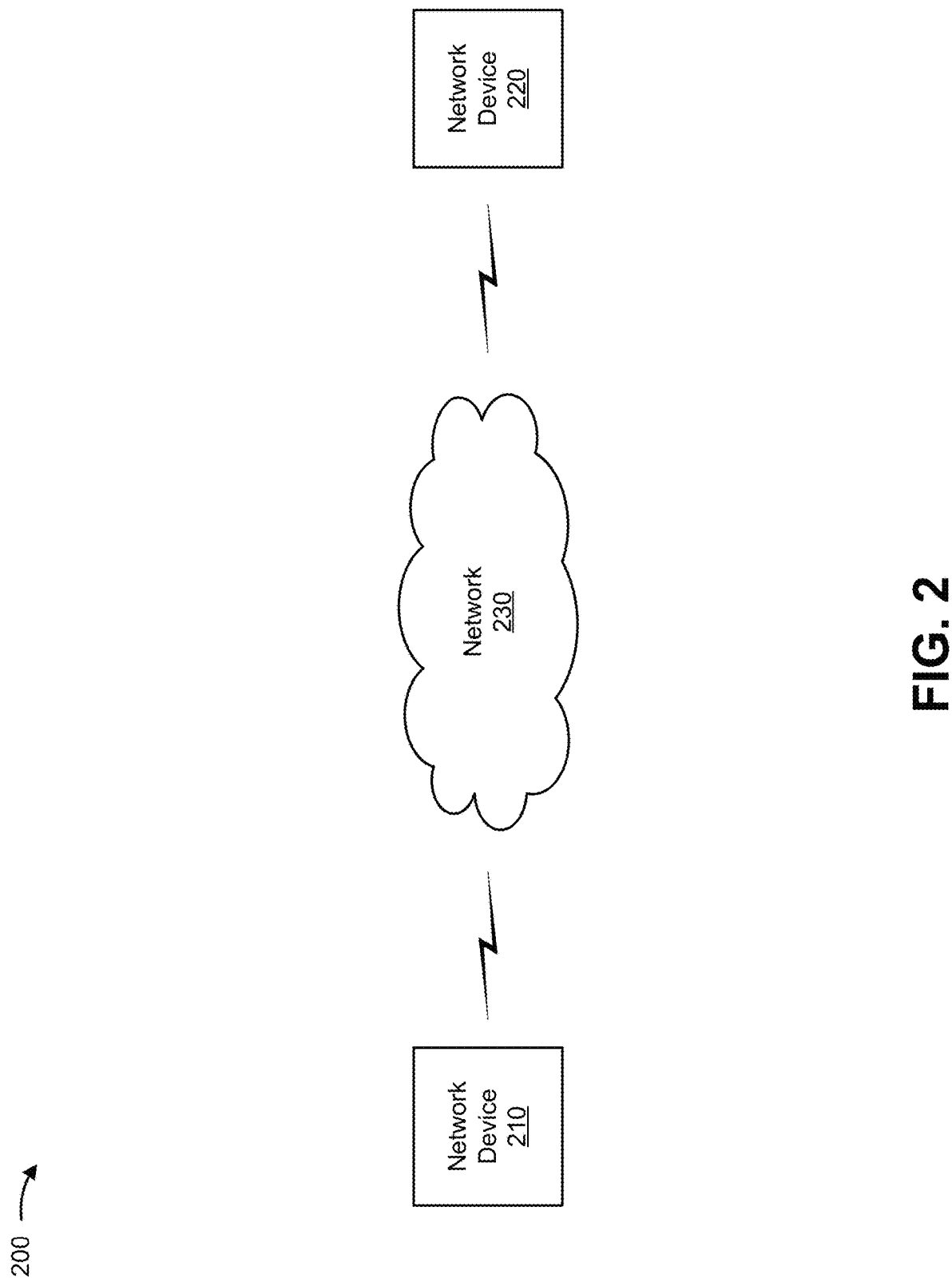
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, a network device 220, and a network 230. Devices of environment 200 may interconnect via wired connections, wireless connections, or a combination of wired and wireless connections.

Network device 210 includes one or more devices capable of receiving, storing, generating, processing, forwarding, and/or transferring information. For example, network device 210 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, network device 210 may be a physical device implemented within a housing, such as a chassis. In some implementations, network device 210 may be a virtual device implemented by one or more computer devices of a cloud computing environment or a data center. In some implementations, network device 210 may be an Internet Key Exchange (IKE) network device.

In some implementations, network device 210 may include various components, such as a data plane, a control plane, and/or the like. In some implementations, the control plane of network device 210 runs an IKE server that handles IKE exchanges (e.g., information communicated on an IPsec tunnel, such as DPD request messages, DPD response messages, and/or the like). In some implementations, network device 210 may identify an IPsec tunnel that connects network device 210 to network device 220. In some implementations, network device 210 may generate and send a DPD request message to network device 220 via the IPsec tunnel, and may receive a DPD response message from network device 220 via the IPsec tunnel. In some implementations, network device 210 may receive a DPD request message from network device 220 via the IPsec tunnel, and may generate and send a DPD response message to network device 220 via the IPsec tunnel. In some implementations, network device 210 may listen for traffic on the IPsec tunnel. In some implementations, network device 210 may send and/or receive DPD messages according to an interval. In some implementations, network device 210 may generate and send (e.g., via the data plane of network device 210) one or more encapsulating security payload (ESP) packets (e.g., one or more ESP packets with TFC payload data) to network device 220 via the IPsec tunnel.

Network device 220 includes one or more devices capable of receiving, storing, generating, processing, forwarding, and/or transferring information. For example, network device 220 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, network device 220 may be a physical device implemented within a housing, such as a chassis. In some implementations, network device 220 may be a virtual device implemented by one or more computer devices of a cloud computing environment or a data center. In some implementations, network device 220 may be an Internet Key Exchange (IKE) network device.

In some implementations, network device 220 may include various components, such as a data plane, a control plane, and/or the like. In some implementations, the control plane of network device 220 runs an IKE server that handles IKE exchanges (e.g., information communicated on an IPsec tunnel, such as DPD request messages, DPD response messages, and/or the like). In some implementations, network device 220 may identify an IPsec tunnel that connects network device 210 to network device 220. In some implementations, network device 220 may generate and send a DPD request message to network device 210 via the IPsec tunnel, and may receive a DPD response message from network device 210 via the IPsec tunnel. In some implementations, network device 220 may receive a DPD request message from network device 210 via the IPsec tunnel, and may generate and send a DPD response message to network device 210 via the IPsec tunnel. In some implementations, network device 210 may generate and send and/or receive DPD messages according to an interval. In some implementations, network device 220 may receive (e.g., via the data plane of network device 220) one or more encapsulating security payload (ESP) packets (e.g., one or more ESP packets with TFC payload data) from network device 210 via the IPsec tunnel.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a communications network, a telecommunications network, a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
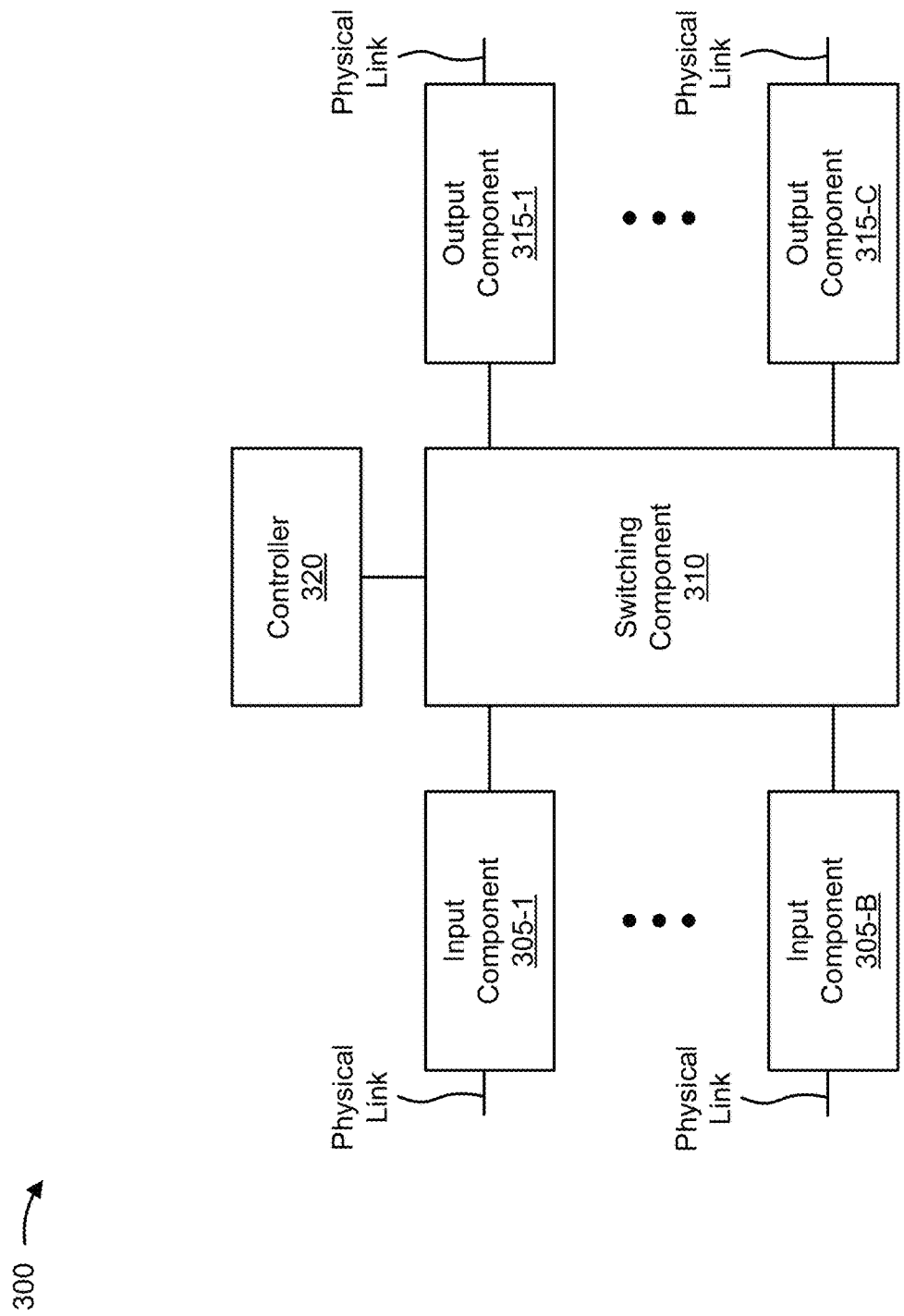
FIG. 3 is a diagram of example components of one or more devices of FIG. 2.

FIG. 3 is a diagram of example components of a device 300. Device 300 may correspond to network device 210 and/or network device 220. In some implementations, network device 210 and/or network device 220 may include one or more devices 300 and/or one or more components of device 300. As shown in FIG. 3, device 300 may include a set of input components 305, a switching component 310, a set of output components 315, and/or a controller 320. In some implementations, components of devices 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that may interpret and/or execute instructions. A processor is implemented in hardware, firmware, or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
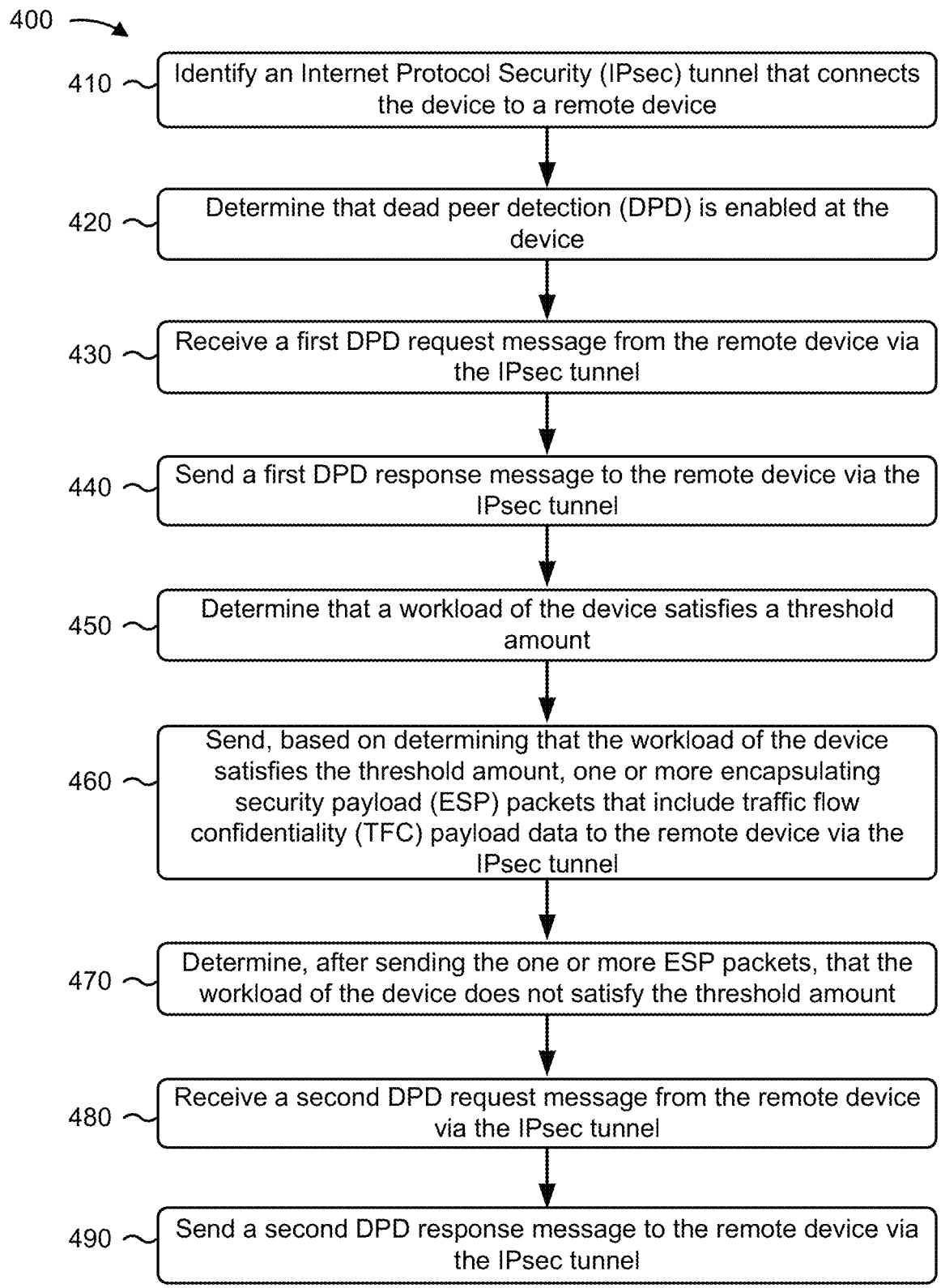
FIG. 4 is a flow chart of an example process for maintaining Internet Protocol Security tunnels.

FIG. 4 is a flow chart of an example process 400 for maintaining Internet Protocol Security tunnels. In some implementations, one or more process blocks of FIG. 4 may be performed by a network device (e.g., network device 210). In some implementations, one or more process blocks of FIG. 4 may be performed by another device or a group of devices separate from or including the network device, such as another network device (e.g., network device 220).

As shown in FIG. 4, process 400 may include identifying an Internet Protocol Security (IPsec) tunnel that connects the device to a remote device (block 410). For example, the network device (e.g., using input component 305, switching component 310, output component 315, controller 320, and/or the like) may identify an IPsec tunnel that connects the device to a remote device, as described above in connection with FIGS. 1A-1F.

As further shown in FIG. 4, process 400 may include determining that dead peer detection (DPD) is enabled at the device (block 420). For example, the network device (e.g., using input component 305, switching component 310, output component 315, controller 320, and/or the like) may determine that DPD is enabled at the device, as described above in connection with FIGS. 1A-1F.

As further shown in FIG. 4, process 400 may include receiving a first DPD request message from the remote device via the IPsec tunnel (block 430). For example, the network device (e.g., using input component 305, switching component 310, controller 320, and/or the like) may receive a first DPD request message from the remote device via the IPsec tunnel, as described above in connection with FIGS. 1A-1F.

As further shown in FIG. 4, process 400 may include sending a first DPD response message to the remote device via the IPsec tunnel (block 440). For example, the network device (e.g., using switching component 310, output component 315, controller 320, and/or the like) may send a first DPD response message to the remote device via the IPsec tunnel, as described above in connection with FIGS. 1A-1F.

As further shown in FIG. 4, process 400 may include determining that a workload of the device satisfies a threshold amount (block 450). For example, the network device (e.g., using controller 320, and/or the like) may determine that a workload of the device satisfies a threshold amount, as described above in connection with FIGS. 1A-1F.

As further shown in FIG. 4, process 400 may include sending, based on determining that the workload of the device satisfies the threshold amount, one or more encapsulating security payload (ESP) packets that include traffic flow confidentiality (TFC) payload data to the remote device via the IPsec tunnel (block 460). For example, the network device (e.g., using switching component 310, output component 315, controller 320, and/or the like) may send, based on determining that the workload of the device satisfies the threshold amount, one or more ESP packets that include traffic flow confidentiality (TFC) payload data to the remote device via the IPsec tunnel, as described above in connection with FIGS. 1A-1F.

As further shown in FIG. 4, process 400 may include determining, after sending the one or more ESP packets, that the workload of the device does not satisfy the threshold amount (block 470). For example, the network device (e.g., using controller 320, and/or the like) may determine, after sending the one or more ESP packets, that the workload of the device does not satisfy the threshold amount, as described above in connection with FIGS. 1A-1F.

As further shown in FIG. 4, process 400 may include receiving a second DPD request message from the remote device via the IPsec tunnel (block 480). For example, the network device (e.g., using input component 305, switching component 310, controller 320, and/or the like) may receive a second DPD request message from the remote device via the IPsec tunnel, as described above in connection with FIGS. 1A-1F.

As further shown in FIG. 4, process 400 may include sending a second DPD response message to the remote device via the IPsec tunnel (block 490). For example, the network device (e.g., using switching component 310, output component 315, controller 320, and/or the like) may send a second DPD response message to the remote device via the IPsec tunnel, as described above in connection with FIGS. 1A-1F.

Process 400 may include additional implementations, such as any single implementation or any combination of implementations described below and/or in connection with one or more other processes described elsewhere herein.

In some implementations, the network device may have a control plane, the network device may be to receive the first DPD request message and the second DPD request message via the control plane, and the network device may be to send the first DPD response message and the second DPD response message via the control plane. In some implementations, the network device may have a data plane, and the network device may be to send the one or more ESP packets via the data plane.

In some implementations, when sending, based on determining that the workload of the network device satisfies the threshold amount, the one or more ESP packets to the remote device via the IPsec tunnel, the network device may identify a recurring interval associated with DPD, may determine a rate for sending the one or more ESP packets, where the rate may be to ensure that at least one ESP packet of the one or more ESP packets is sent during the recurring interval, and may send the one or more ESP packets to the remote device via the IPsec tunnel at the rate.

In some implementations, the IPsec tunnel may be maintained while the network device sends the one or more ESP packets to the remote device via the IPsec tunnel. In some implementations, the workload of the network device may indicate a utilization of processing resources associated with a control plane of the network device. In some implementations, when determining that the workload of the device satisfies the threshold amount, the network device may determine that the utilization of processing resources associated with the control plane of the device satisfies the threshold amount.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
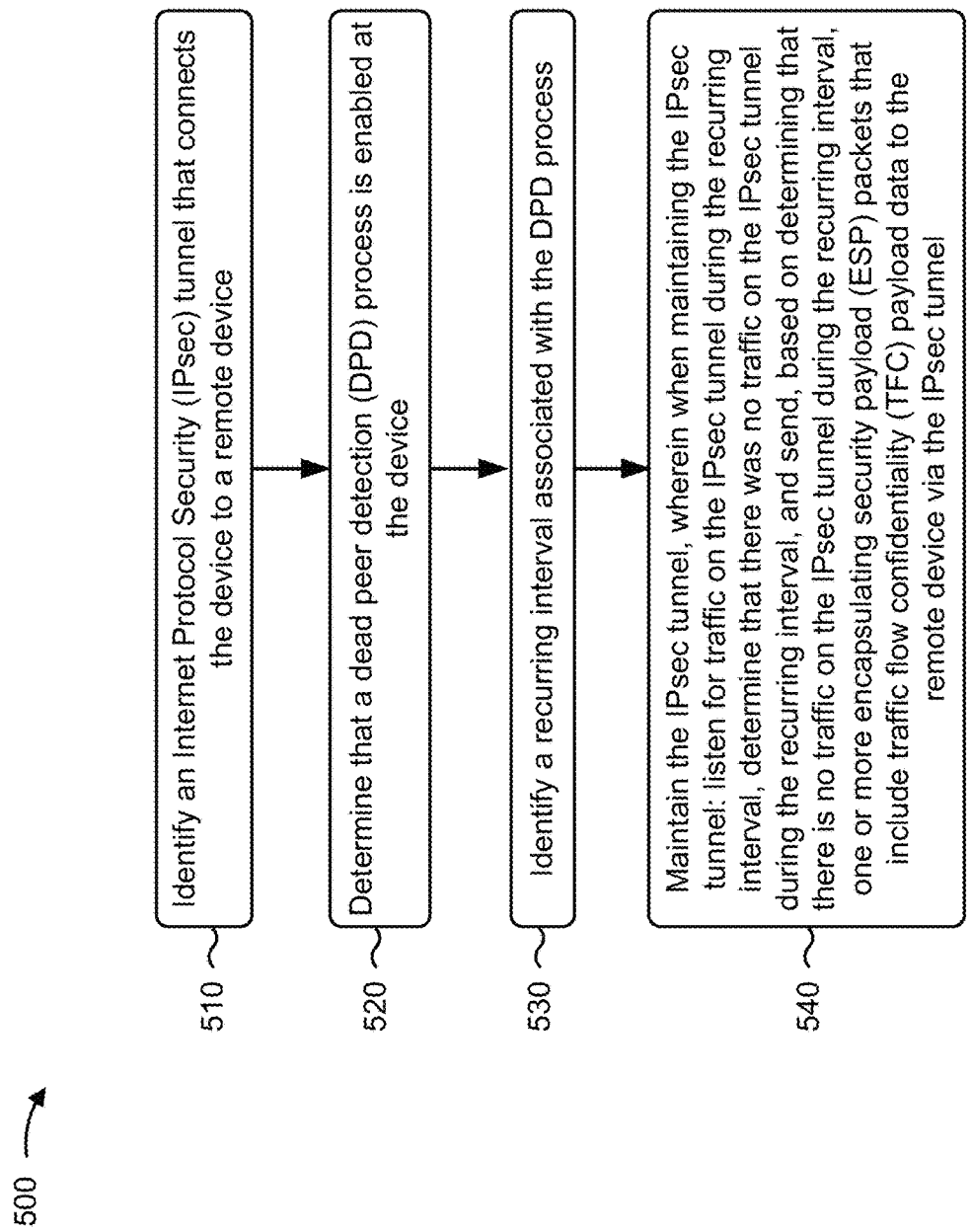
FIG. 5 is a flow chart of an example process for maintaining Internet Protocol Security tunnels.

FIG. 5 is a flow chart of an example process 500 for maintaining Internet Protocol Security tunnels. In some implementations, one or more process blocks of FIG. 5 may be performed by a network device (e.g., network device 210). In some implementations, one or more process blocks of FIG. 5 may be performed by another device or a group of devices separate from or including the network device, such as another network device (e.g., network device 220).

As shown in FIG. 5, process 500 may include identifying an Internet Protocol Security (IPsec) tunnel that connects the device to a remote device (block 510). For example, the network device (e.g., using switching component 310, output component 315, controller 320, and/or the like) may identify an IPsec tunnel that connects the device to a remote device, as described above in connection with FIGS. 1A-1F.

As further shown in FIG. 5, process 500 may include determining that a dead peer detection (DPD) process is enabled at the device (block 520). For example, the network device (e.g., using switching component 310, output component 315, controller 320, and/or the like) may determine that a DPD process is enabled at the device, as described above in connection with FIGS. 1A-1F.

As further shown in FIG. 5, process 500 may include identifying a recurring interval associated with the DPD process (block 530). For example, the network device (e.g., using switching component 310, output component 315, controller 320, and/or the like) may identify a recurring interval associated with the DPD process, as described above in connection with FIGS. 1A-1F.

As further shown in FIG. 5, process 500 may include maintaining the IPsec tunnel, wherein, when maintaining the IPsec tunnel, process 500 may include listening for traffic on the IPsec tunnel during the recurring interval, determining that there was no traffic on the IPsec tunnel during the recurring interval, and sending, based on determining that there is no traffic on the IPsec tunnel during the recurring interval, one or more encapsulating security payload (ESP) packets that include traffic flow confidentiality (TFC) payload data to the remote device via the IPsec tunnel (block 540). For example, the network device (e.g., using switching component 310, output component 315, controller 320, and/or the like) may maintain the IPsec tunnel, as described above in connection with FIGS. 1A-1F. In some implementations, the network device may listen for traffic on the IPsec tunnel during the recurring interval, determine that there was no traffic on the IPsec tunnel during the recurring interval, and send, based on determining that there is no traffic on the IPsec tunnel during the recurring interval, one or more ESP packets that include traffic flow confidentiality (TFC) payload data to the remote device via the IPsec tunnel.

Process 500 may include additional implementations, such as any single implementation or any combination of implementations described below and/or in connection with one or more other processes described elsewhere herein.

In some implementations, when sending, based on determining that there is no traffic on the IPsec tunnel during the recurring interval, the one or more ESP packets to the remote device via the IPsec tunnel, the network device may send the one or more ESP packets from a data plane of the device to the remote device via the IPsec tunnel.

In some implementations, when listening for traffic on the IPsec tunnel during the recurring interval, the network device may determine whether the device sends one or more outgoing messages to the remote device via the IPsec tunnel during the recurring interval, and may determine whether the device receives one or more incoming messages from the remote device via the IPsec tunnel during the recurring interval. In some implementations, when determining that there was no traffic on the IPsec tunnel during the recurring interval, the network device may determine that the device did not send or receive information via the IPsec tunnel during the recurring interval.

In some implementations, the one or more ESP packets may include a protocol value that indicates that the one or more ESP packets are dummy packets. In some implementations, the one or more ESP packets may be formatted to cause the remote device to discard the one or more ESP packets upon receiving the one or more ESP packets. In some implementations, the one or more ESP packets may include payload data, where the payload data includes plaintext that is not well-formed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
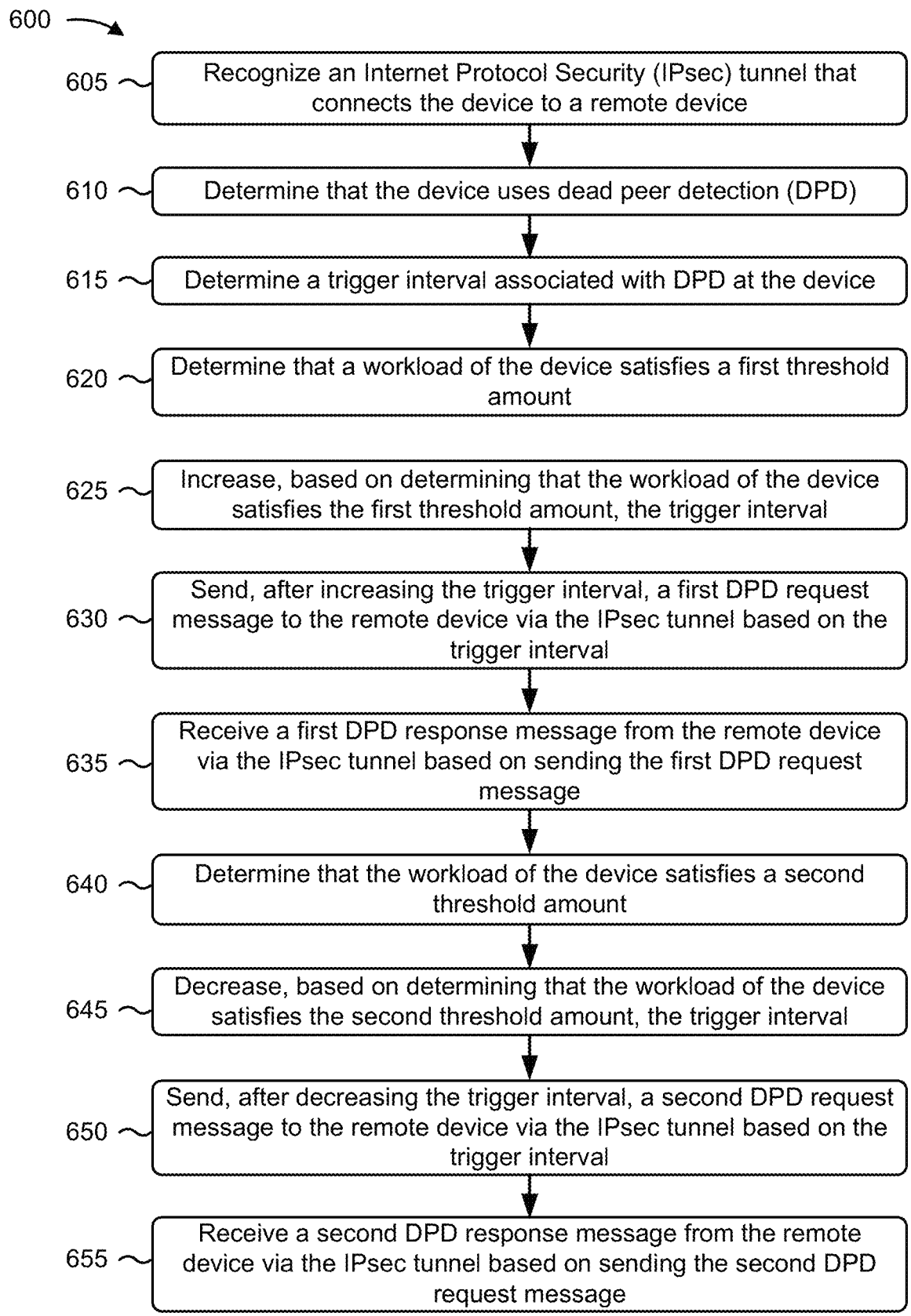
FIG. 6 is a flow chart of an example process for maintaining Internet Protocol Security tunnels.

FIG. 6 is a flow chart of an example process 600 for maintaining Internet Protocol Security tunnels. In some implementations, one or more process blocks of FIG. 6 may be performed by a network device (e.g., network device 210). In some implementations, one or more process blocks of FIG. 6 may be performed by another device or a group of devices separate from or including the network device, such as another network device (e.g., network device 220).

As shown in FIG. 6, process 600 may include recognizing an Internet Protocol Security (IPsec) tunnel that connects the device to a remote device (block 605). For example, the network device (e.g., using input component 305, switching component 310, output component 315, controller 320, and/or the like) may recognize an IPsec tunnel that connects the device to a remote device, as described above in connection with FIGS. 1A-1F.

As further shown in FIG. 6, process 600 may include determining that the device uses dead peer detection (DPD) (block 610). For example, the network device (e.g., using input component 305, switching component 310, output component 315, controller 320, and/or the like) may determine that the device uses DPD, as described above in connection with FIGS. 1A-1F.

As further shown in FIG. 6, process 600 may include determining a trigger interval associated with DPD at the device (block 615). For example, the network device (e.g., using input component 305, switching component 310, output component 315, controller 320, and/or the like) may determine a trigger interval associated with DPD at the device, as described above in connection with FIGS. 1A-1F.

As further shown in FIG. 6, process 600 may include determining that a workload of the device satisfies a first threshold amount (block 620). For example, the network device (e.g., using controller 320, and/or the like) may determine that a workload of the device satisfies a first threshold amount, as described above in connection with FIGS. 1A-1F.

As further shown in FIG. 6, process 600 may include increasing, based on determining that the workload of the device satisfies the first threshold amount, the trigger interval (block 625). For example, the network device (e.g., using input component 305, switching component 310, output component 315, controller 320, and/or the like) may increase, based on determining that the workload of the device satisfies the first threshold amount, the trigger interval, as described above in connection with FIGS. 1A-1F.

As further shown in FIG. 6, process 600 may include sending, after increasing the trigger interval, a first DPD request message to the remote device via the IPsec tunnel based on the trigger interval (block 630). For example, the network device (e.g., using switching component 310, output component 315, controller 320, and/or the like) may send, after increasing the trigger interval, a first DPD request message to the remote device via the IPsec tunnel based on the trigger interval, as described above in connection with FIGS. 1A-1F.

As further shown in FIG. 6, process 600 may include receiving a first DPD response message from the remote device via the IPsec tunnel based on sending the first DPD request message (block 635). For example, the network device (e.g., using input component 305, switching component 310, controller 320, and/or the like) may receive a first DPD response message from the remote device via the IPsec tunnel based on sending the first DPD request message, as described above in connection with FIGS. 1A-1F.

As further shown in FIG. 6, process 600 may include determining that the workload of the device satisfies a second threshold amount (block 640). For example, the network device (e.g., using controller 320, and/or the like) may determine that the workload of the device satisfies a second threshold amount, as described above in connection with FIGS. 1A-1F.

As further shown in FIG. 6, process 600 may include decreasing, based on determining that the workload of the device satisfies the second threshold amount, the trigger interval (block 645). For example, the network device (e.g., using input component 305, switching component 310, output component 315, controller 320, and/or the like) may decrease, based on determining that the workload of the device satisfies the second threshold amount, the trigger interval, as described above in connection with FIGS. 1A-1F.

As further shown in FIG. 6, process 600 may include sending, after decreasing the trigger interval, a second DPD request message to the remote device via the IPsec tunnel based on the trigger interval (block 650). For example, the network device (e.g., using switching component 310, output component 315, controller 320, and/or the like) may send, after decreasing the trigger interval, a second DPD request message to the remote device via the IPsec tunnel based on the trigger interval, as described above in connection with FIGS. 1A-1F.

As further shown in FIG. 6, process 600 may include receiving a second DPD response message from the remote device via the IPsec tunnel based on sending the second DPD request message (block 655). For example, the network device (e.g., using input component 305, switching component 310, output component 315, controller 320, and/or the like) may receive a second DPD response message from the remote device via the IPsec tunnel based on sending the second DPD request message, as described above in connection with FIGS. 1A-1F.

Process 600 may include additional implementations, such as any single implementation or any combination of implementations described below and/or in connection with one or more other processes described elsewhere herein.

In some implementations, the network device may send, after determining that the workload of the device satisfies the first threshold amount, one or more encapsulating security payload (ESP) packets to the remote device via the IPsec tunnel. In some implementations, the one or more ESP packets may be one or more dummy packets. In some implementations, when sending, after determining that the workload of the device satisfies the first threshold amount, the one or more ESP packets to the remote device via the IPsec tunnel, the network device may send the one or more ESP packets to the remote device via the IPsec tunnel using a data plane of the device.

In some implementations, the workload of the device may indicate a utilization rate of a control plane of the device. In some implementations, when determining that the workload of the device satisfies the first threshold amount, the network device may determine that the utilization rate of the control plane of the device satisfies the first threshold amount.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a network device 210 that is capable of modifying DPD at network device 210 to maintain an IPsec tunnel with a network device 220 while reducing a workload of processing resources associated with network device 210. In some implementations, network device 210 may determine that a workload of the network device satisfies a threshold amount and send one or more encapsulating security payload (ESP) packets to network device 220 via the IPsec tunnel. In some implementations, network device 210 may determine that the workload of the device satisfies a threshold amount and modify an interval associated with DPD at network device 210 to exchange DPD messages with network device 220 according to the interval. In some implementations, network device 210 may disable DPD and send one or more ESP packets to network device 220 via the IPsec tunnel.

In this way, implementations described herein enable network device 210 and network device 220 to stay connected via the IPsec tunnel even when the network device or network device 220 is overloaded. In this way, time is not wasted reinitiating IKE and IPsec negotiations between the network device and network device 220. Moreover, in this way, a workload of network device 210 may be reduced because some implementations require less use of processor and/or memory resources of network device 210. Furthermore, a process for maintaining IPsec tunnels is automated and network device 210 may maintain numerous (e.g., hundreds, thousands, millions, and/or the like) IPsec tunnels at the same time. This may improve speed and efficiency of the process and conserve computing resources (e.g., processor resources, memory resources, and/or the like) of network device 210 and/or network device 220. Furthermore, automating the process for maintaining IPsec tunnels conserves computing resources (e.g., processor resources, memory resources, and/or the like) of network device 210 and/or network device 220 that would otherwise be wasted using a traditional DPD process.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   identifying, by a device, an Internet Protocol Security (IPsec) tunnel that connects the device to a remote device;
   determining, by the device, that dead peer detection (DPD) is enabled at the device;
   receiving, by the device, a first DPD request message from the remote device via the IPsec tunnel;
   sending, by the device, a first DPD response message to the remote device via the IPsec tunnel;
   determining, by the device, that a workload of the device satisfies a threshold amount;
   identifying, by the device, an interval associated with the DPD,
   the interval being an amount of time the remote device waits to generate and send a DPD request message after detecting idleness of the IPsec tunnel;
   determining, by the device, a rate to send one or more encapsulating security payload (ESP) packets ensuring that at least one ESP packet is generated and sent during the interval maintaining the IPsec tunnel while minimizing network resources of the device;
   sending, by the device and based on determining that the workload of the device satisfies the threshold amount, the one or more ESP packets that include traffic flow confidentiality (TFC) payload data to the remote device via the IPsec tunnel based on the rate;
   determining, by the device and after sending the one or more ESP packets, that the workload of the device does not satisfy the threshold amount;
   receiving, by the device, a second DPD request message from the remote device via the IPsec tunnel; and
   sending, by the device, a second DPD response message to the remote device via the IPsec tunnel.

2. The method of claim 1, wherein the device has a control plane,
   wherein the device is to receive the first DPD request message and the second DPD request message via the control plane, and
   the device is to send the first DPD response message and the second DPD response message via the control plane.

3. The method of claim 2, wherein the device has a data plane,
   wherein the device is to send the one or more ESP packets via the data plane.

4. The method of claim 1, wherein the IPsec tunnel is maintained while the device sends the one or more ESP packets to the remote device via the IPsec tunnel.

5. The method of claim 1, wherein the workload of the device indicates a utilization of processing resources associated with a control plane of the device.

6. The method of claim 5, wherein determining that the workload of the device satisfies the threshold amount comprises:
   determining that the utilization of processing resources associated with the control plane of the device satisfies the threshold amount.

7. The method of claim 1, wherein the device sends the one or more ESP packets to minimize an amount of DPD request messages that the device receives from the remote device.

8. A non-transitory computer-readable medium storing instructions, the instructions comprising:
   one or more instructions that, when executed by one or more processors of a device, cause the one or more processors to:
   recognize an Internet Protocol Security (IPsec) tunnel that connects the device to a remote device;
   determine that the device uses dead peer detection (DPD);
   determine a trigger interval associated with DPD at the device,
   the trigger interval being an amount of time the remote device waits to generate and send a DPD request message after detecting idleness of the IPsec tunnel;
   determine a rate to send DPD messages ensuring that at least one DPD message is generated and sent during the trigger interval and that the IPsec tunnel is maintained;
   determine that a workload of the device satisfies a first threshold amount;
   send, after determining that the workload of the device satisfies the first threshold amount, one or more encapsulating security payload (ESP) packets that include traffic flow confidentiality (TFC) payload data to the remote device via the IPsec tunnel;
   increase, based on determining that the workload of the device satisfies the first threshold amount, the trigger interval reducing the workload of the device;
   send, after increasing the trigger interval, a first DPD request message to the remote device via the IPsec tunnel based on the trigger interval;
   receive a first DPD response message from the remote device via the IPsec tunnel based on sending the first DPD request message;
   determine that the workload of the device satisfies a second threshold amount;
   decrease, based on determining that the workload of the device satisfies the second threshold amount, the trigger interval;
   send, after decreasing the trigger interval, a second DPD request message to the remote device via the IPsec tunnel based on the trigger interval; and
   receive a second DPD response message from the remote device via the IPsec tunnel based on sending the second DPD request message.

9. The non-transitory computer-readable medium of claim 8, wherein the one or more ESP packets are one or more dummy packets.

10. The non-transitory computer-readable medium of claim 8, wherein the one or more instructions, that cause the one or more processors to send, after determining that the workload of the device satisfies the first threshold amount, the one or more ESP packets to the remote device via the IPsec tunnel, cause the one or more processors to:
   send the one or more ESP packets to the remote device via the IPsec tunnel using a data plane of the device.

11. The non-transitory computer-readable medium of claim 8, wherein the workload of the device indicates the rate of a control plane of the device.

12. The non-transitory computer-readable medium of claim 11, wherein the one or more instructions, that cause the one or more processors to determine that the workload of the device satisfies the first threshold amount, cause the one or more processors to:
   determine that the rate of the control plane of the device satisfies the first threshold amount.

13. The non-transitory computer-readable medium of claim 8, wherein the device sends the one or more ESP packets to minimize an amount of DPD request messages that the device receives from the remote device.

14. A device, comprising:
   one or more memories; and
   one or more processors communicatively coupled to the one or more memories to:
   identify an Internet Protocol Security (IPsec) tunnel that connects the device to a remote device;
   determine that dead peer detection (DPD) is enabled at the device;
   receive a first DPD request message from the remote device via the IPsec tunnel;
   send a first DPD response message to the remote device via the IPsec tunnel;
   determine that a workload of the device satisfies a threshold amount;
   identify an interval associated with receiving one or more DPD request messages,
   the interval being an amount of time the remote device waits to generate and send a DPD request message after detecting idleness of the IPsec tunnel;
   determine a rate to send one or more encapsulating security payload (ESP) packets ensuring that at least one ESP packet is generated and sent during the interval maintaining the IPsec tunnel while minimizing network resources of the device;
   send, based on determining that the workload of the device satisfies the threshold amount, the one or more ESP packets that include traffic flow confidentiality (TFC) payload data to the remote device via the IPsec tunnel based on the rate;
   determine, after sending the one or more ESP packets, that the workload of the device does not satisfy the threshold amount;
   receive a second DPD request message from the remote device via the IPsec tunnel; and
   send a second DPD response message to the remote device via the IPsec tunnel.

15. The device of claim 14, wherein the device has a control plane,
   wherein the device is to receive the first DPD request message and the second DPD request message via the control plane, and
   the device is to send the first DPD response message and the second DPD response message via the control plane.

16. The device of claim 15, wherein the device has a data plane, and
   wherein the device is to send the one or more ESP packets via the data plane.

17. The device of claim 14, wherein the IPsec tunnel is maintained while the device sends the one or more ESP packets to the remote device via the IPsec tunnel.

18. The device of claim 14, wherein the workload of the device indicates a utilization of processing resources associated with a control plane of the device.

19. The device of claim 18, wherein the one or more processors when determining that the workload of the device satisfies the threshold amount are to:
    determine that the utilization of processing resources associated with the control plane of the device satisfies the threshold amount.

20. The device of claim 14, wherein the device sends the one or more ESP packets to minimize an amount of DPD request messages that the device receives from the remote device.

\* \* \* \* \*